United States Patent
Vyas et al.

(10) Patent No.: US 11,832,137 B2
(45) Date of Patent: Nov. 28, 2023

(54) TECHNIQUES FOR DISCONTINUOUS RECEPTION COLLISION HANDLING FOR MULTIPLE SUBSCRIBER IDENTITY MODULE USER EQUIPMENT

(71) Applicant: QUALCOMM Incorporated, San Diego, CA (US)

(72) Inventors: Uttam Vyas, Hyderabad (IN); Sumanth Kumar Kota, Hyderabad (IN); Rishika Tindola, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/222,355

(22) Filed: Apr. 5, 2021

(65) Prior Publication Data

US 2022/0322164 A1    Oct. 6, 2022

(51) Int. Cl.
*H04W 36/00* (2009.01)
*H04W 76/28* (2018.01)
(Continued)

(52) U.S. Cl.
CPC ......... *H04W 36/0061* (2013.01); *H04W 8/02* (2013.01); *H04W 36/00835* (2018.08);
(Continued)

(58) Field of Classification Search
CPC ............... H04W 36/0061; H04W 8/20; H04W 36/00835; H04W 36/30; H04W 76/27;
(Continued)

(56) References Cited

U.S. PATENT DOCUMENTS 9,807,814 B2 * 10/2017 Su .................. H04W 76/28
2017/0019820 A1    1/2017 Das
(Continued)

FOREIGN PATENT DOCUMENTS

WO    2015073448 A1    5/2015
WO    2020191524 A1    10/2020
(Continued)

OTHER PUBLICATIONS

International Search Report and Written Opinion—PCT/US2022/071042—ISA/EPO—dated Jul. 5, 2022.

*Primary Examiner* — Charles N Appiah
*Assistant Examiner* — Frank E Donado
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive handover information associated with one or more neighbor cells. The UE may identify that a first discontinuous reception (DRX) cycle associated with a first subscriber identity module (SIM) of the UE at least partially overlaps with a second DRX cycle associated with a second SIM of the UE. The UE may identify that at least one of the first DRX cycle or the second DRX cycle does not overlap with a third DRX cycle associated with a neighbor cell of the one or more neighbor cells. The UE may transmit, to the neighbor cell, a message associated with a handover of at least one of the first SIM or the second SIM to the neighbor cell. Numerous other aspects are described.

30 Claims, 9 Drawing Sheets

(51) Int. Cl.
*H04W 76/27* (2018.01)
*H04W 8/20* (2009.01)
*H04W 36/30* (2009.01)
*H04W 8/02* (2009.01)

(52) U.S. Cl.
CPC ........... *H04W 36/30* (2013.01); *H04W 76/27* (2018.02); *H04W 76/28* (2018.02)

(58) Field of Classification Search
CPC .. H04W 76/28; H04W 36/36; H04W 36/0027
See application file for complete search history.

(56) References Cited

U.S. PATENT DOCUMENTS

| 2017/0353893 | A1* | 12/2017 | Marwah | ............ | H04W 36/0022 |
| 2019/0223096 | A1* | 7/2019 | Zhang | ............... | H04W 52/0206 |
| 2022/0070752 | A1* | 3/2022 | Kim | ..................... | H04W 36/32 |

FOREIGN PATENT DOCUMENTS

| WO | 2021015950 | A1 | 1/2021 |
| WO | 2022055541 |  | 3/2022 |

* cited by examiner

TECHNIQUES FOR DISCONTINUOUS RECEPTION COLLISION HANDLING FOR MULTIPLE SUBSCRIBER IDENTITY MODULE USER EQUIPMENT

FIELD OF THE DISCLOSURE

Aspects of the present disclosure generally relate to wireless communication and to techniques and apparatuses for discontinuous reception (DRX) collision handling for a multiple subscriber identity module (SIM) user equipment (UE).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving handover information associated with one or more neighbor cells; identifying that a first discontinuous reception (DRX) cycle associated with a first subscriber identity module (SIM) of the UE at least partially overlaps with a second DRX cycle associated with a second SIM of the UE; identifying, based at least in part on the reception of the handover information, that at least one of the first DRX cycle or the second DRX cycle does not overlap with a third DRX cycle associated with a neighbor cell of the one or more neighbor cells; and transmitting, to the neighbor cell, a message associated with a handover of at least one of the first SIM or the second SIM to the neighbor cell based at least in part on the identification that at least one of the first DRX cycle or the second DRX cycle does not overlap with the third DRX cycle.

In some aspects, receiving the handover information includes receiving a radio resource control configuration message associated with a conditional handover or a conditional primary secondary cell change indicating the handover information for the one or more neighbor cells.

In some aspects, transmitting the message associated with the handover is based at least in part on a quality of the neighbor cell satisfying a quality threshold.

In some aspects, identifying that at least one of the first DRX cycle or the second DRX cycle does not overlap with the third DRX cycle includes identifying that a set of neighbor cells, that includes the neighbor cell, are associated with DRX cycles that do not overlap with at least one of the first DRX cycle or the second DRX cycle; determining whether a quality of neighbor cells included in the set of neighbor cells satisfies a quality threshold; and selecting the neighbor cell from the set of neighbor cells based at least in part on at least one of a quality of the neighbor cell or the determination of whether the quality of the neighbor cells included in the set of neighbor cells satisfies the quality threshold.

In some aspects, selecting the neighbor cell from set of neighbor cells includes determining that the neighbor cell is associated with a highest received quality value of received quality values of the neighbor cells included in the set of neighbor cells.

In some aspects, the method includes modifying, after performing the handover to the neighbor cell, a measurement value of the neighbor cell based at least in part on a power offset value.

In some aspects, modifying the measurement value of the neighbor cell includes measuring a first measurement value of a previous serving cell associated with a DRX collision; measuring a second measurement value of the neighbor cell; and modifying the second measurement value to a modified second measurement value such that a difference between the first measurement value and the modified second measurement value is the power offset value. In some aspects, the method includes transmitting a measurement report indicating a modified measurement value of the neighbor cell.

In some aspects, identifying that the first DRX cycle associated with the first SIM of the UE at least partially overlaps with the second DRX cycle associated with the second SIM of the UE includes identifying a number of occasions during which the first DRX cycle associated with the first SIM of the UE at least partially overlaps with the second DRX cycle associated with the second SIM; and determining that a DRX collision event has occurred based at least in part on the number of occasions satisfying a collision threshold.

In some aspects, transmitting the message associated with the handover is based at least in part on the determination that the DRX collision event has occurred.

In some aspects, transmitting the message associated with the handover includes transmitting, to the neighbor cell, a random access channel message to establish a connection with the neighbor cell.

In some aspects, the method includes communicating, using at least one of the first SIM or the second SIM, in a dual SIM dual standby (DSDS) mode.

In some aspects, a UE for wireless communication includes a memory and one or more processors, coupled to the memory, configured to: receive handover information associated with one or more neighbor cells; identify that a first DRX cycle associated with a first SIM of the UE at least partially overlaps with a second DRX cycle associated with a second SIM of the UE; identify, based at least in part on the reception of the handover information, that at least one of the first DRX cycle or the second DRX cycle does not overlap with a third DRX cycle associated with a neighbor cell of the one or more neighbor cells; and transmit, to the neighbor cell, a message associated with a handover of at least one of the first SIM or the second SIM to the neighbor cell based at least in part on the identification that at least one of the first DRX cycle or the second DRX cycle does not overlap with the third DRX cycle.

In some aspects, the one or more processors, to receive the handover information, are configured to receive a radio resource control configuration message associated with a conditional handover or a conditional primary secondary cell change indicating the handover information for the one or more neighbor cells.

In some aspects, transmitting the message associated with the handover is based at least in part on a quality of the neighbor cell satisfying a quality threshold.

In some aspects, the one or more processors, to identify that at least one of the first DRX cycle or the second DRX cycle does not overlap with the third DRX cycle, are configured to identify that a set of neighbor cells, that includes the neighbor cell, are associated with DRX cycles that do not overlap with at least one of the first DRX cycle or the second DRX cycle; determine whether a quality of neighbor cells included in the set of neighbor cells satisfies a quality threshold; and select the neighbor cell from the set of neighbor cells based at least in part on at least one of a quality of the neighbor cell or the determination of whether the quality of the neighbor cells included in the set of neighbor cells satisfies the quality threshold.

In some aspects, the one or more processors, to select the neighbor cell from set of neighbor cells, are configured to determine that the neighbor cell is associated with a highest received quality value of received quality values of the neighbor cells included in the set of neighbor cells.

In some aspects, the one or more processors are further configured to modify, after performing the handover to the neighbor cell, a measurement value of the neighbor cell based at least in part on a power offset value.

In some aspects, the one or more processors, to modify the measurement value of the neighbor cell, are configured to measure a first measurement value of a previous serving cell associated with a DRX collision; measure a second measurement value of the neighbor cell; and modify the second measurement value to a modified second measurement value such that a difference between the first measurement value and the modified second measurement value is the power offset value. In some aspects, the one or more processors are further configured to transmit a measurement report indicating a modified measurement value of the neighbor cell.

In some aspects, the one or more processors, to identify that the first DRX cycle associated with the first SIM of the UE at least partially overlaps with the second DRX cycle associated with the second SIM of the UE, are configured to identify a number of occasions during which the first DRX cycle associated with the first SIM of the UE at least partially overlaps with the second DRX cycle associated with the second SIM; and determine that a DRX collision event has occurred based at least in part on the number of occasions satisfying a collision threshold.

In some aspects, transmitting the message associated with the handover is based at least in part on the determination that the DRX collision event has occurred.

In some aspects, the one or more processors, to transmit the message associated with the handover, are configured to: transmit, to the neighbor cell, a random access channel message to establish a connection with the neighbor cell.

In some aspects, the one or more processors are further configured to communicate, using at least one of the first SIM or the second SIM, in a DSDS mode.

In some aspects, a non-transitory computer-readable medium storing a set of instructions for wireless communication includes one or more instructions that, when executed by one or more processors of a UE, cause the UE to: receive handover information associated with one or more neighbor cells; identify that a first DRX cycle associated with a first SIM of the UE at least partially overlaps with a second DRX cycle associated with a second SIM of the UE; identify, based at least in part on the reception of the handover information, that at least one of the first DRX cycle or the second DRX cycle does not overlap with a third DRX cycle associated with a neighbor cell of the one or more neighbor cells; and transmit, to the neighbor cell, a message associated with a handover of at least one of the first SIM or the second SIM to the neighbor cell based at least in part on the identification that at least one of the first DRX cycle or the second DRX cycle does not overlap with the third DRX cycle.

In some aspects, the one or more instructions, that cause the UE to receive the handover information, cause the UE to receive a radio resource control configuration message associated with a conditional handover or a conditional primary secondary cell change indicating the handover information for the one or more neighbor cells.

In some aspects, transmitting the message associated with the handover is based at least in part on a quality of the neighbor cell satisfying a quality threshold.

In some aspects, the one or more instructions, that cause the UE to identify that at least one of the first DRX cycle or the second DRX cycle does not overlap with the third DRX cycle, cause the UE to identify that a set of neighbor cells, that includes the neighbor cell, are associated with DRX cycles that do not overlap with at least one of the first DRX cycle or the second DRX cycle; determine whether a quality of neighbor cells included in the set of neighbor cells satisfies a quality threshold; and select the neighbor cell from the set of neighbor cells based at least in part on at least one of a quality of the neighbor cell or the determination of whether the quality of the neighbor cells included in the set of neighbor cells satisfies the quality threshold.

In some aspects, the one or more instructions, that cause the UE to select the neighbor cell from set of neighbor cells, cause the UE to determine that the neighbor cell is associated with a highest received quality value of received quality values of the neighbor cells included in the set of neighbor cells.

In some aspects, the one or more instructions further cause the UE to modify, after performing the handover to the neighbor cell, a measurement value of the neighbor cell based at least in part on a power offset value.

In some aspects, the one or more instructions, that cause the UE to modify the measurement value of the neighbor cell, cause the UE to measure a first measurement value of a previous serving cell associated with a DRX collision; measure a second measurement value of the neighbor cell; and modify the second measurement value to a modified second measurement value such that a difference between the first measurement value and the modified second measurement value is the power offset value. In some aspects, the one or more instructions further cause the UE to transmit a measurement report indicating a modified measurement value of the neighbor cell.

In some aspects, the one or more instructions, that cause the UE to identify that the first DRX cycle associated with the first SIM of the UE at least partially overlaps with the second DRX cycle associated with the second SIM of the UE, cause the UE to identify a number of occasions during which the first DRX cycle associated with the first SIM of the UE at least partially overlaps with the second DRX cycle associated with the second SIM; and determine that a DRX collision event has occurred based at least in part on the number of occasions satisfying a collision threshold.

In some aspects, transmitting the message associated with the handover is based at least in part on the determination that the DRX collision event has occurred.

In some aspects, the one or more instructions, that cause the UE to transmit the message associated with the handover, cause the UE to transmit, to the neighbor cell, a random access channel message to establish a connection with the neighbor cell.

In some aspects, the one or more instructions further cause the UE to communicate, using at least one of the first SIM or the second SIM, in a DSDS mode.

In some aspects, an apparatus for wireless communication includes means for receiving handover information associated with one or more neighbor cells; means for identifying that a first DRX cycle associated with a first SIM of the apparatus at least partially overlaps with a second DRX cycle associated with a second SIM of the apparatus; means for identifying, based at least in part on the reception of the handover information, that at least one of the first DRX cycle or the second DRX cycle does not overlap with a third DRX cycle associated with a neighbor cell of the one or more neighbor cells; and means for transmitting, to the neighbor cell, a message associated with a handover of at least one of the first SIM or the second SIM to the neighbor cell based at least in part on the identification that at least one of the first DRX cycle or the second DRX cycle does not overlap with the third DRX cycle.

In some aspects, the means for receiving the handover information includes means for receiving a radio resource control configuration message associated with a conditional handover or a conditional primary secondary cell change indicating the handover information for the one or more neighbor cells.

In some aspects, transmitting the message associated with the handover is based at least in part on a quality of the neighbor cell satisfying a quality threshold.

In some aspects, the means for identifying that at least one of the first DRX cycle or the second DRX cycle does not overlap with the third DRX cycle includes means for identifying that a set of neighbor cells, that includes the neighbor cell, are associated with DRX cycles that do not overlap with at least one of the first DRX cycle or the second DRX cycle; means for determining whether a quality of neighbor cells included in the set of neighbor cells satisfies a quality threshold; and means for selecting the neighbor cell from the set of neighbor cells based at least in part on at least one of a quality of the neighbor cell or the determination of whether the quality of the neighbor cells included in the set of neighbor cells satisfies the quality threshold.

In some aspects, the means for selecting the neighbor cell from set of neighbor cells includes means for determining that the neighbor cell is associated with a highest received quality value of received quality values of the neighbor cells included in the set of neighbor cells.

In some aspects, the apparatus includes means for modifying, after performing the handover to the neighbor cell, a measurement value of the neighbor cell based at least in part on a power offset value.

In some aspects, the means for modifying the measurement value of the neighbor cell includes means for measuring a first measurement value of a previous serving cell associated with a DRX collision; means for measuring a second measurement value of the neighbor cell; and means for modifying the second measurement value to a modified second measurement value such that a difference between the first measurement value and the modified second measurement value is the power offset value. In some aspects, the apparatus includes means for transmitting a measurement report indicating a modified measurement value of the neighbor cell.

In some aspects, the means for identifying that the first DRX cycle associated with the first SIM of the apparatus at least partially overlaps with the second DRX cycle associated with the second SIM of the apparatus includes means for identifying a number of occasions during which the first DRX cycle associated with the first SIM of the apparatus at least partially overlaps with the second DRX cycle associated with the second SIM; and means for determining that a DRX collision event has occurred based at least in part on the number of occasions satisfying a collision threshold.

In some aspects, transmitting the message associated with the handover is based at least in part on the determination that the DRX collision event has occurred.

In some aspects, the means for transmitting the message associated with the handover includes means for transmitting, to the neighbor cell, a random access channel message to establish a connection with the neighbor cell.

In some aspects, the apparatus includes means for communicating, using at least one of the first SIM or the second SIM, in a DSDS mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
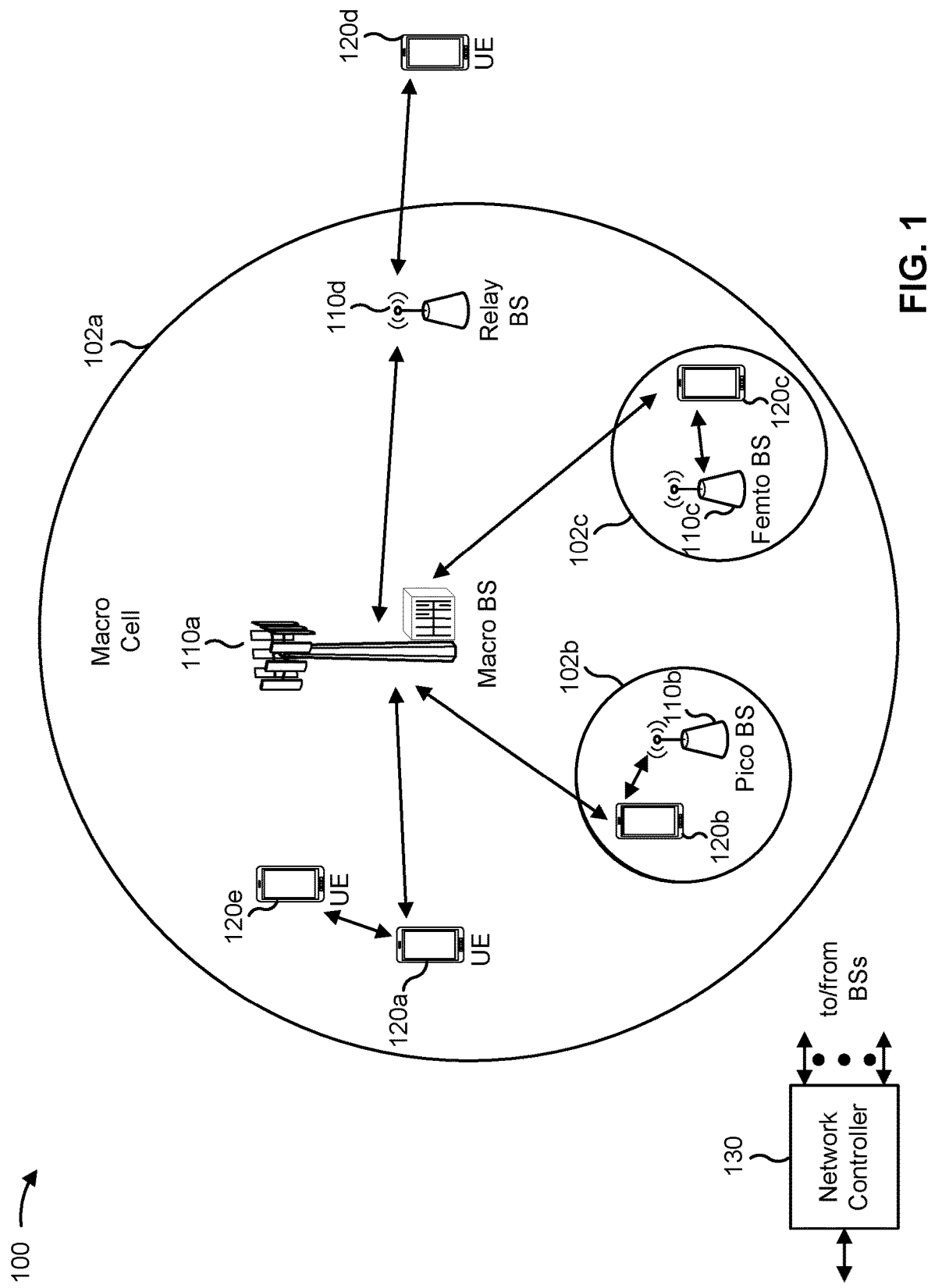
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
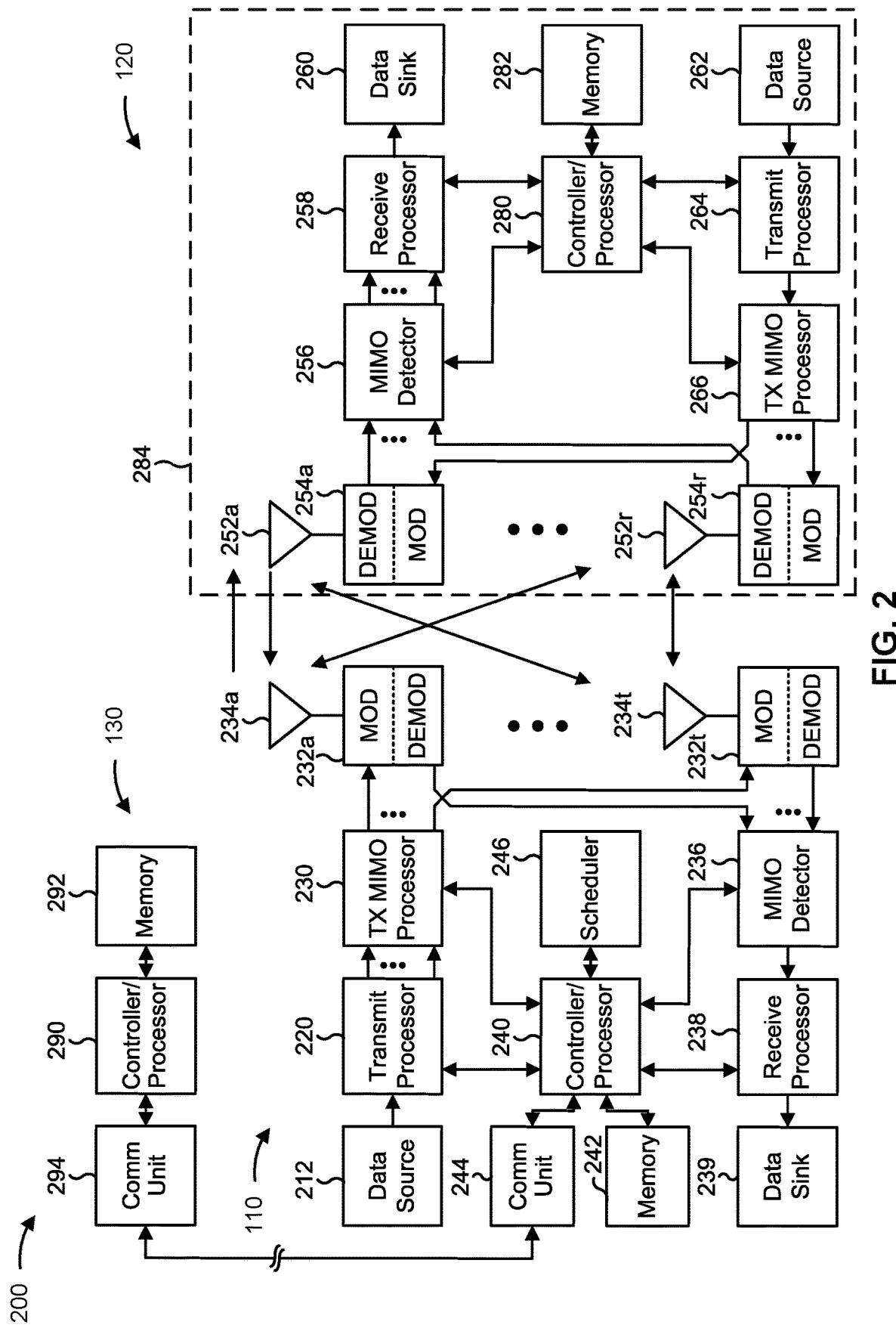
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with discontinuous reception (DRX) collision handling for a multiple subscriber identity module (SIM) UE, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include miming the instructions, converting the instructions, compiling the instructions, and/or interpreting the instructions.

In some aspects, the UE 120 includes means for receiving handover information associated with one or more neighbor cells; means for identifying that a first DRX cycle associated with a first SIM of the UE 120 at least partially overlaps with a second DRX cycle associated with a second SIM of the UE 120; means for identifying, based at least in part on the reception of the handover information, that at least one of the first DRX cycle or the second DRX cycle does not overlap with a third DRX cycle associated with a neighbor cell of the one or more neighbor cells; and/or means for transmitting, to the neighbor cell, a message associated with a handover of at least one of the first SIM or the second SIM to the neighbor cell based at least in part on the identification that at least one of the first DRX cycle or the second DRX cycle does not overlap with the third DRX cycle. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving a radio resource control configuration message associated with a conditional handover or a conditional primary secondary cell change indicating the handover information for the one or more neighbor cells.

In some aspects, the UE 120 includes means for identifying that a set of neighbor cells, that includes the neighbor cell, are associated with DRX cycles that do not overlap with at least one of the first DRX cycle or the second DRX cycle; means for determining whether a quality of neighbor cells included in the set of neighbor cells satisfies a quality threshold; and/or means for selecting the neighbor cell from the set of neighbor cells based at least in part on at least one of a quality of the neighbor cell or the determination of whether the quality of the neighbor cells included in the set of neighbor cells satisfies the quality threshold.

In some aspects, the UE 120 includes means for determining that the neighbor cell is associated with a highest received quality value of received quality values of the neighbor cells included in the set of neighbor cells.

In some aspects, the UE 120 includes means for modifying, after performing the handover to the neighbor cell, a measurement value of the neighbor cell based at least in part on a power offset value.

In some aspects, the UE 120 includes means for measuring a first measurement value of a previous serving cell associated with a DRX collision; means for measuring a second measurement value of the neighbor cell; and/or means for modifying the second measurement value to a modified second measurement value such that a difference between the first measurement value and the modified second measurement value is the power offset value. In some aspects, the UE 120 includes means for transmitting a measurement report indicating a modified measurement value of the neighbor cell.

In some aspects, the UE 120 includes means for identifying a number of occasions during which the first DRX cycle associated with the first SIM of the UE at least partially overlaps with the second DRX cycle associated with the second SIM; and/or means for determining that a DRX collision event has occurred based at least in part on the number of occasions satisfying a collision threshold.

In some aspects, the UE 120 includes means for transmitting, to the neighbor cell, a random access channel message to establish a connection with the neighbor cell.

In some aspects, the UE 120 includes means for communicating, using at least one of the first SIM or the second SIM, in a dual SIM dual standby (DSDS) mode.

As indicated above, FIG. 2 is provided as an example. Other examples may differ from what is described with regard to FIG. 2.

Figure 3:
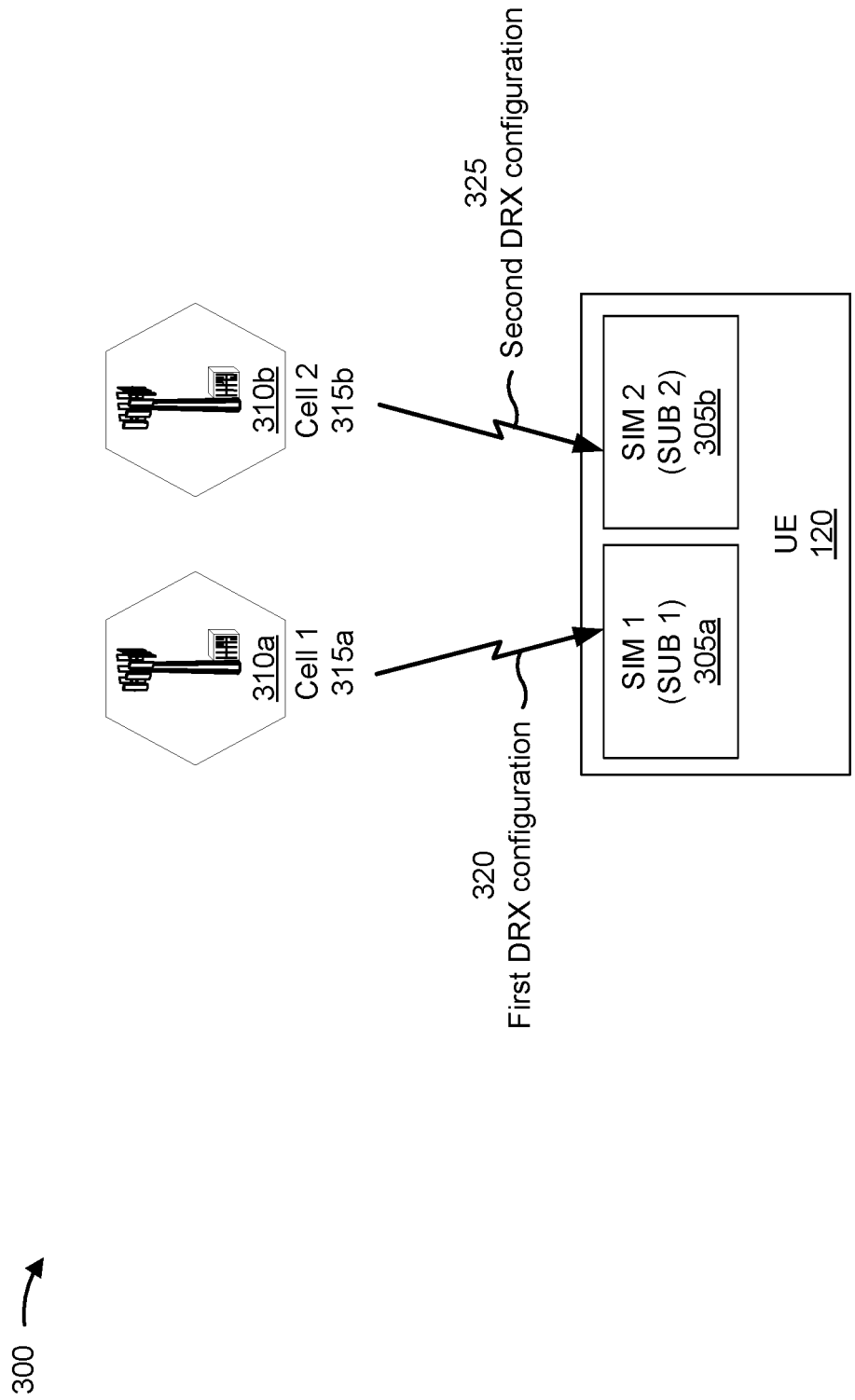
FIG. 3 is a diagram illustrating an example of a multiple subscriber identity module (multi-SIM) UE, in accordance with the present disclosure.

FIG. 3 is a diagram illustrating an example 300 of a multiple SIM (multi-SIM) UE, in accordance with the present disclosure. As shown in FIG. 3, a UE 120 may be a multi-SIM UE that includes multiple SIMs (two or more SIMs), shown as a first SIM 305*a* and a second SIM 305*b*. The first SIM 305*a* may be associated with a first subscription (shown as SUB 1), and the second SIM 305*b* may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310*a* via a first cell 315*a* (shown as Cell 1) using the first SIM 305*a*. In this case, a first subscription (SUB 1) of the UE 120 may be used to access the first cell 315*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310*b* via a second cell 315*b* (shown as Cell 2) using the second SIM 305*b*. In this case, a second subscription (SUB 2) of the UE 120 may be used to access the second cell 315*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315*a* and the second cell 315*b* may be provided by the same base station. Thus, in some aspects, the first base station 310*a* and the second base station 310*b* may be integrated into a single base station.

In some cases, each cell (e.g., the first cell 315*a* and the second cell 315*b*) may be associated with a unique configuration associated with that cell. For example, as shown by reference number 320, the first cell 315*a* (and/or the first base station 310*a*) may transmit a first discontinuous reception (DRX) configuration to the UE 120 (e.g., and the first SIM 305*a*). As shown by reference number 325, the second cell 315*b* (and/or the second base station 310*b*) may transmit a second DRX configuration to the UE 120 (e.g., and the second SIM 305*b*). The UE 120 may use the first DRX configuration for operations associated with the first SIM 305*a* and may use the second DRX configuration for operations associated with the second SIM 305*b*. A DRX configuration may configure a DRX cycle, as explained in more detail below in connection with FIG. 4.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMs of the UE 120. Thus, a UE 120 in the DSDA mode is capable of communicating using the first SIM 305a (and the first subscription) at the same time as communicating using the second SIM 305b (and the second subscription). For example, when the UE 120 is in an active session (e.g., a voice call or another latency sensitive service, such as online gaming, stock trading, or an over-the-top (OTT) service) using the first SIM 305a, the UE 120 is capable of receiving a notification of a voice call using the second SIM 305b without interrupting communications that use the first SIM 305a, and without tuning or switching away from the first cell 315a to tune to the second cell 315b.

In a DSDS mode, the UE 120 is not capable of concurrent active communication using both SIMs of the UE 120. Thus, a UE 120 in the DSDS mode is not capable of communicating using the first SIM 305a (and the first subscription) at the same time as communicating using the second SIM 305b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315a (as well as the first SIM 305a and the first subscription) uses an NR RAT and the second cell 315b (as well as the second SIM 305b and the second subscription) also uses the NR RAT. However, the UE 120 may not be capable of operating in a DSDA mode for NR+LTE, where one of the first cell 315a (as well as the first SIM 305a and the first subscription) uses an NR RAT and the second cell 315b (as well as the second SIM 305b and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

As indicated above, FIG. 3 is provided as an example. Other examples may differ from what is described with regard to FIG. 3.

Figure 4:
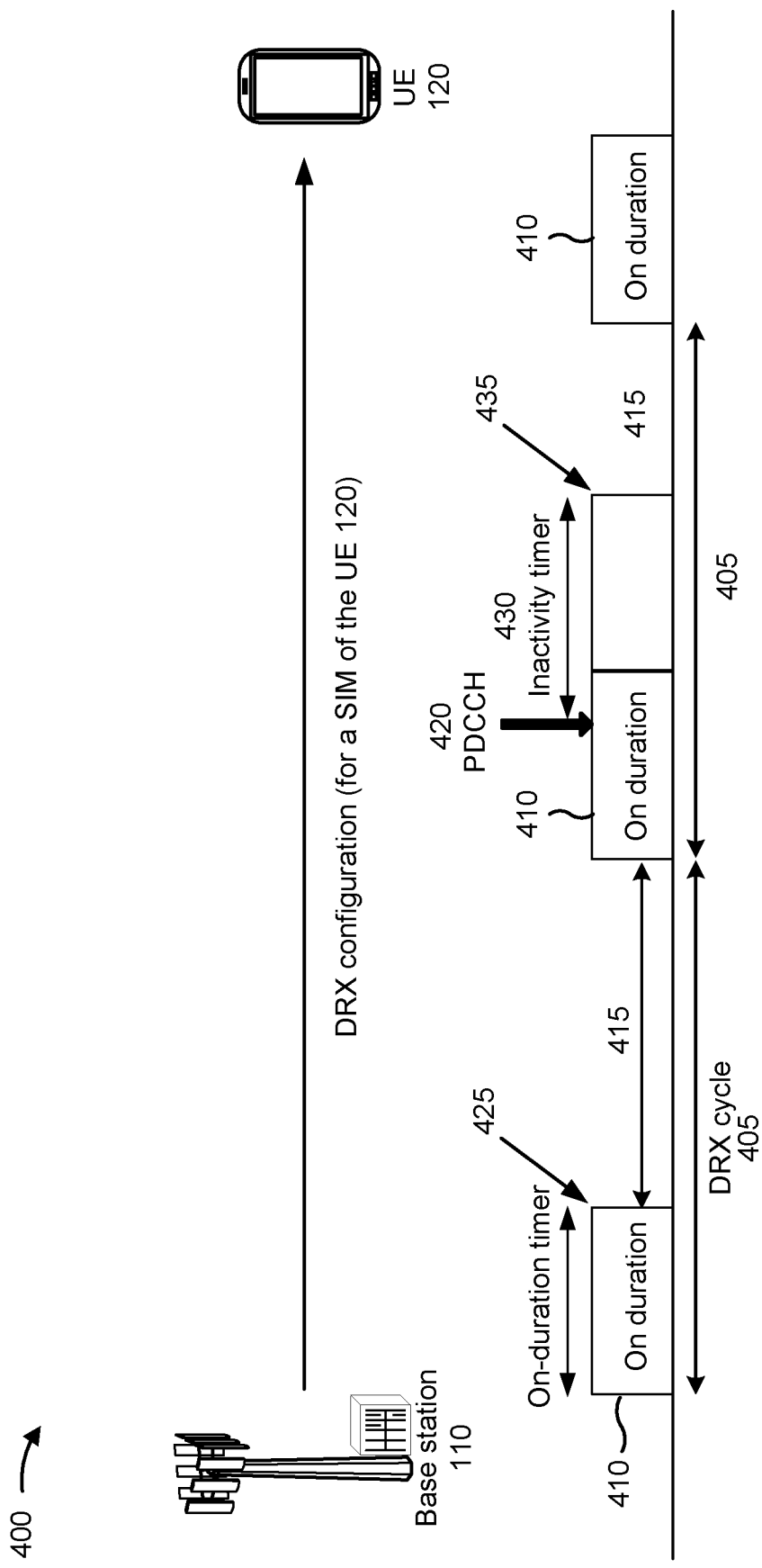
FIG. 4 is a diagram illustrating an example of a discontinuous reception (DRX) configuration, in accordance with the present disclosure.

FIG. 4 is a diagram illustrating an example 400 of a DRX configuration, in accordance with the present disclosure.

As shown in FIG. 4, a base station 110 may transmit a DRX configuration to a UE 120 to configure a DRX cycle 405 for the UE 120. In some cases, a UE 120 may be configured with multiple DRX configurations. For example, a multi-SIM UE may be configured with a first DRX cycle for a first SIM (and/or a first subscription) of the UE 120 and a second DRX cycle for a second SIM (and/or a second subscription) of the UE 120.

A DRX cycle 405 may include a DRX on duration 410 (e.g., during which a UE 120 is awake or in an active state) and an opportunity to enter a DRX sleep state 415. As used herein, the time during which the UE 120 is configured to be in an active state during the DRX on duration 410 may be referred to as an active time, and the time during which the UE 120 is configured to be in the DRX sleep state 415 may be referred to as an inactive time. As described below, the UE 120 may monitor a physical downlink control channel (PDCCH) during the active time, and may refrain from monitoring the PDCCH during the inactive time.

During the DRX on duration 410 (e.g., the active time), the UE 120 may monitor a downlink control channel (e.g., a PDCCH), as shown by reference number 420. For example, the UE 120 may monitor the PDCCH for downlink control information (DCI) pertaining to the UE 120. If the UE 120 does not detect and/or successfully decode any PDCCH communications intended for the UE 120 during the DRX on duration 410, then the UE 120 may enter the sleep state 415 (e.g., for the inactive time) at the end of the DRX on duration 410, as shown by reference number 425. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 430 (e.g., which may extend the active time). The UE 120 may start the DRX inactivity timer 430 at a time at which the PDCCH communication is received (e.g., in a transmission time interval (TTI) in which the PDCCH communication is received, such as a slot or a subframe). The UE 120 may remain in the active state until the DRX inactivity timer 430 expires, at which time the UE 120 may enter the sleep state 415 (e.g., for the inactive time), as shown by reference number 435. During the duration of the DRX inactivity timer 430, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 430 after each detection of a PDCCH communication for the UE 120 for an initial transmission (e.g., but not for a retransmission). By operating in this manner, the UE 120 may conserve battery power and reduce power consumption by entering the sleep state 415.

As indicated above, FIG. 4 is provided as an example. Other examples may differ from what is described with respect to FIG. 4.

In some cases, a UE may receive conditional handover information from the network (e.g., from a base station). For example, the network may configure the UE with a conditional handover (CHO) or a conditional primary secondary cell (PSCell) change (CPC). For example, the network may transmit a handover command (e.g., as a radio resource control (RRC) message, such as an RRC reconfiguration message) indicating handover information for a neighbor cell and triggers (such as RSRP thresholds or RSRQ thresholds) for the UE initiating a handover to the neighbor cell. The UE may store the handover command and may not apply the handover command until a trigger is satisfied. For example, a CHO configuration or a CPC configuration may define criteria to apply the stored handover command (e.g., based at least in part on the quality of the serving cell(s) and neighbor cells).

This reduces latency associated with a handover procedure because the network may configure the UE with handover information for neighbor cells prior to the UE requiring a handover. For example, previously the UE may have been required to first transmit a measurement report (e.g., that could fail to be transmitted) and then wait to receive the handover command (e.g., which may fail to be received). By receiving the conditional handover information, the UE may monitor the quality of the serving cell(s) and neighbor cells. If a criterion or trigger for applying a conditional handover command is met, then the UE may transmit a message to a neighbor cell to complete a handover to the neighbor cell (for example, a random access channel (RACH) message and/or a message indicating that the criterion or trigger for applying a conditional handover command has been met). This greatly reduces the latency associated with the handover procedure and increases the likelihood that the handover procedure will be successful.

In a multi-SIM mode such as a dual SIM dual standby (DSDS) mode, a dedicated data service (DDS) subscriber may perform data activity, and/or call activity, among other examples. A non-DDS subscriber may perform call-related activity, small data activity (e.g., short message service (SMS) activity or multimedia message service (MMS) activity), or similar tasks. "Subscriber" or "subscription" may be used interchangeably with "SIM" herein. The UE may perform activity associated with a DDS subscriber and a non-DDS subscriber via respective resource control connections (e.g., different RRC connections for the DDS subscriber and the non-DDS subscriber).

In some cases, a network may not release an RRC connection after a data or signaling session has concluded. This may result in a corresponding subscriber (e.g., a DDS or non-DDS subscriber) staying in an RRC connected mode until the RRC connection is released. In a connected mode, the network may configure a connected mode DRX (CDRX) cycle, such as a CDRX cycle longer than 160 ms. If a DDS subscriber and a non-DDS subscriber are in an RRC connected mode, the network may configure respective CDRX cycles for the DDS subscriber and the non-DDS subscriber. The CDRX cycles may save power for the UE, and may facilitate the sharing of radio frequency resources between the subscribers, assuming that the CDRX cycles are properly configured.

While maintaining an RRC connection after the conclusion of the data or signaling session may be advantageous for a single-SIM UE, the maintenance of multiple RRC connections for a multi-SIM UE may increase the risk of colliding CDRX cycles. For example, if respective CDRX cycles of the DDS subscriber and the non-DDS subscriber are aligned so that on durations of the respective CDRX cycles at least partially overlap with each other in the time domain (referred to herein as a collision), radio frequency resources may have to be allocated to only one of the subscribers, thereby diminishing throughput, causing missed calls, increasing latency, degrading user experience, and causing an out of sync (OOS) or a radio link failure (RLF) status. For example, a DRX collision between SIMs of a multi-SIM UE may result in missing call notifications (for example, mobile termination (MT) call notifications), degraded data rates, and/or high latency, among other examples.

Some techniques and apparatuses described herein enable DRX cycle collision handling for a multi-SIM UE by leveraging information included in conditional handover information. For example, the UE may identify that a first DRX cycle associated with a first SIM overlaps (e.g., collides with) a second DRX cycle associated with a second SIM. The UE may receive handover information (e.g., conditional handover information) from the network (e.g., from a base station). For example, the UE may receive a CHO configuration and/or a CPC configuration, among other examples. The UE may identify that the handover information indicates DRX configurations for one or more neighbor cells. The UE may identify a neighbor cell with a DRX configuration that resolves the collision (e.g., that does not collide with the first DRX cycle and/or the second DRX cycle) based at least in part on the handover information. The UE may transmit a message associated with a handover to the identified neighbor cell (e.g., to establish a connection with the neighbor cell for the first SIM or the second SIM).

As a result, the UE may be enabled to identify a neighbor cell with a DRX cycle that resolves the collision (e.g., that does not collide with the first DRX cycle and/or the second DRX cycle) prior to transmitting a measurement report or another message to initiate a handover procedure. Therefore, the UE is enabled to identify a suitable neighbor cell without transmitting any signals (e.g., a measurement report). This reduces a signaling overhead and a latency associated with identifying a neighbor cell to resolve an identified DRX collision. By ensuring that a neighbor cell resolves an identified DRX collision and by establishing a connection with the neighbor cell for the first SIM or the second SIM, the UE may improve throughput, improve reliability (e.g., of calls), reduce latency, improve a user experience, and/or reduce occurrences of OOS and/or RLF status, among other examples.

Figure 5:
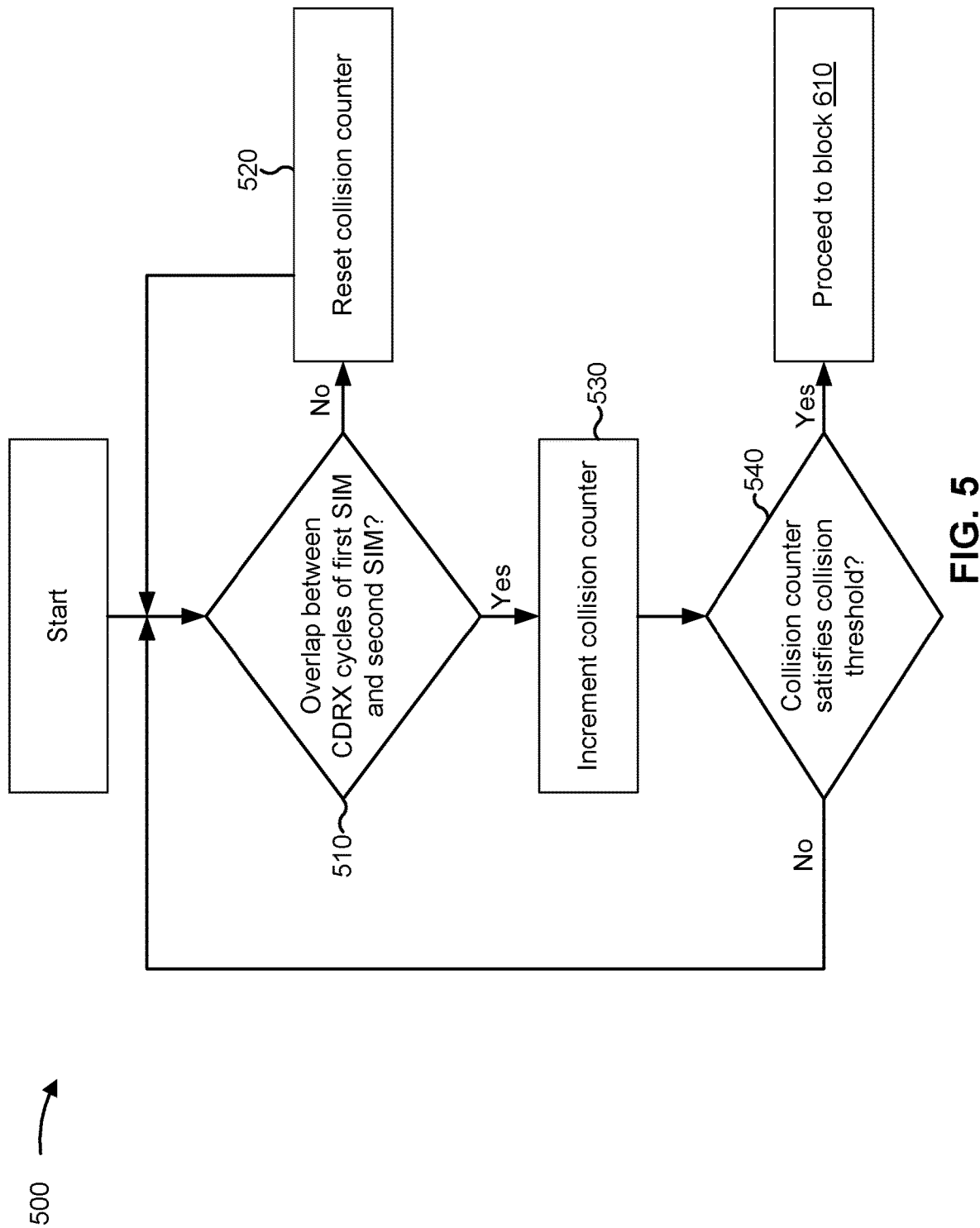
FIGS. 5 and 6 are diagrams illustrating examples of DRX cycle collision handling for a multi-SIM UE, in accordance with the present disclosure.
Figure 6:
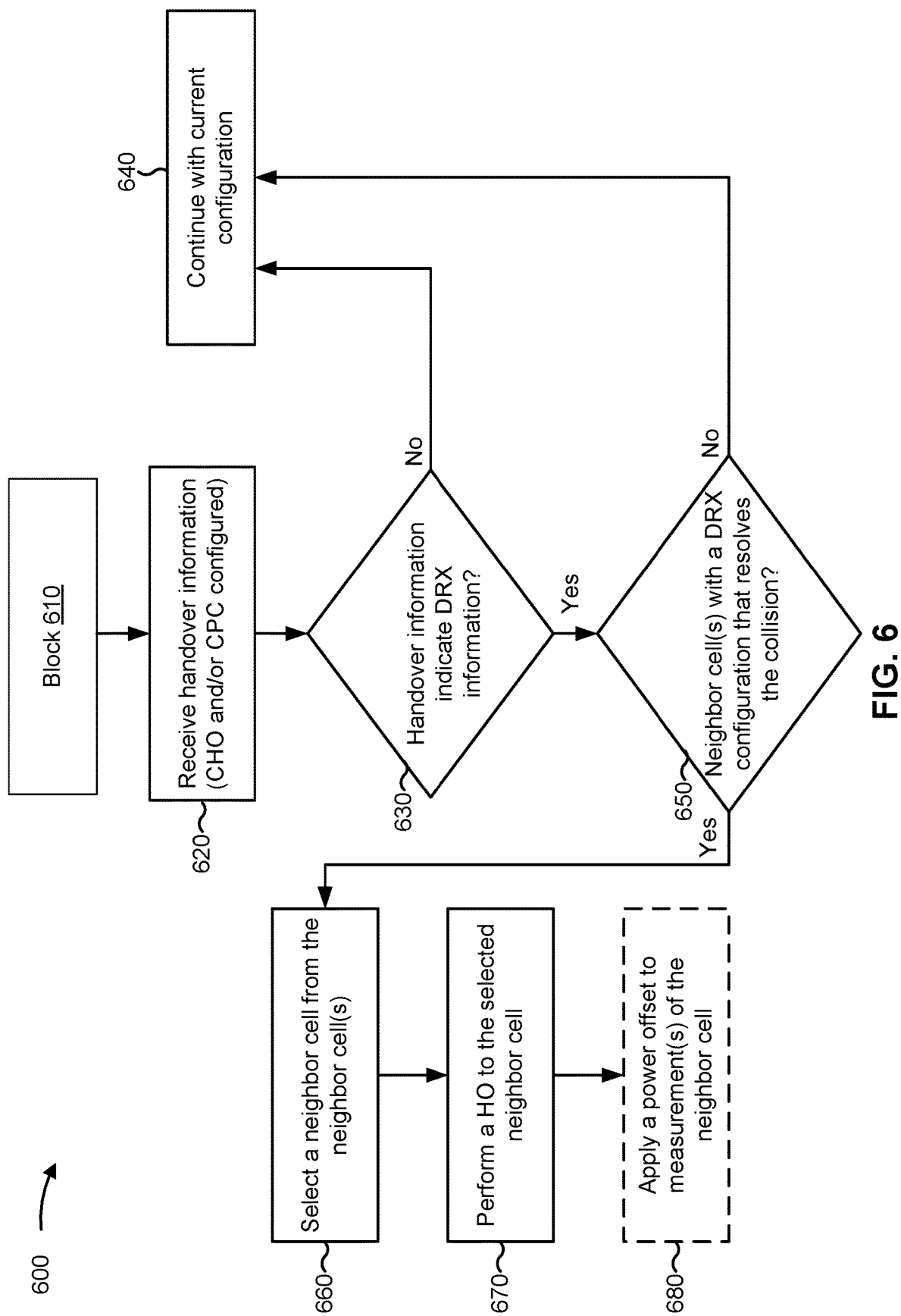

FIGS. 5 and 6 are diagrams illustrating examples 500 and 600 of DRX cycle collision handling for a multi-SIM UE, in accordance with the present disclosure. The operations shown in examples 500 and 600 may be performed by a UE (e.g., UE 120). For example, the UE may be a multi-SIM UE associated with two or more SIMs (e.g., a SIM associated with a DDS subscriber and a SIM associated with a non-DDS subscriber). A first SIM may be associated with a first DRX cycle (e.g., a first CDRX cycle) and a second SIM may be associated with a second DRX cycle (e.g., a second CDRX cycle). While example 500 is described with regard to two SIMs (e.g., a first SIM and a second SIM), the operations described with regard to example 500 can be performed for any number of SIMs associated with respective CDRX cycles. The UE may be operating in a DSDS mode, as described above.

Example 500 relates to identifying an overlap, also referred to as a collision, between the first DRX cycle and the second DRX cycle. As shown in example 500, the UE may determine whether an overlap between CDRX cycles of the first SIM and the second SIM is detected (block 510). For example, the UE may determine whether an active time (and/or an on duration) of the first DRX cycle at least partially overlaps an active time (and/or an on duration) of the second DRX cycle. In some aspects, the UE may determine whether the active times of the first DRX cycle and the second DRX cycle overlap each other by at least a threshold (e.g., a threshold percentage of the active time). The UE may perform this determination periodically, at each active time, upon detecting a threshold throughput diminution, and/or based at least in part on another condition.

If the UE determines that an overlap is not detected (block 510—No), then the UE may reset a collision counter (block 520) and return to block 510. The collision counter may indicate whether the UE is to attempt to trigger handover to another cell. By resetting the collision counter if an overlap is not detected, the UE avoids triggering the handover when a collision is not persistent (e.g., where a collision is for a short duration of time or does not continue or persist over time), thereby conserving resources that would otherwise be used to trigger and facilitate the handover.

If the UE determines that an overlap is detected (block 510—Yes), then the UE may increment the collision counter (block 530). As further shown, the UE may determine whether the collision counter satisfies a collision threshold (block 540). For example, the UE may perform the determination of block 540 periodically, and/or based at least in part on incrementing the collision counter, among other examples. In some aspects, the collision threshold may be preconfigured for the UE (e.g., based at least in part on a wireless communication specification, such as a 3GPP specification). If the collision counter fails to satisfy the collision threshold (block 540—No), then the UE may return to block 510. If the collision counter satisfies the collision threshold (block 540—Yes), then the UE may take action to mitigate the overlap between the first DRX cycle and the DRX cycle, which is described starting at block 610 of FIG. 6. For example, if the collision counter satisfies the collision threshold, then the UE may determine that a DRX collision event has occurred and may take action to mitigate the overlap between the first DRX cycle and the DRX cycle, as described herein.

Turning to FIG. 6, the UE may receive handover information associated with one or more neighbor cells (block 620). For example, the UE may receive (e.g., in an RRC reconfiguration message) a CHO configuration and/or a CPC configuration. The handover information may identify one or more neighbor cells, one or more conditional reconfiguration options, and/or one or more RRC measurement configurations to enable the UE to identify target neighbor cells for a handover procedure. For example, the handover information may identify a neighbor cell, one or more parameters or configurations associated with the neighbor cell, and/or one or more triggers or criteria for completing a handover to the neighbor cell (e.g., for applying the handover command indicated in the handover information to the neighbor cell), among other examples. In some aspects, the UE may receive the handover information from a serving cell of the first SIM or a serving cell of the second SIM (e.g., the handover information may be configured for the first SIM or the second SIM).

The UE may determine whether the handover information indicates DRX configuration information for the neighbor cells (block 630). For example, the UE may determine if the handover information includes information associated with DRX configurations of the neighbor cells. If the handover information does not indicate DRX configuration information for the neighbor cells (block 630—No), then the UE may continue with the current configuration (block 640). For example, the UE may continue to operate with the current DRX configurations for the first SIM and the second SIM.

If the handover information indicates DRX configuration information for at least one neighbor cell (block 630—Yes), then the UE 120 may determine whether one or more neighbor cells (e.g., indicated by the handover information) are associated with a DRX configuration that resolves the collision (block 650). For example, the UE may identify whether at least one of the first DRX cycle or the second DRX cycle does not overlap (e.g., collide) with a third DRX cycle associated with a neighbor cell indicated by the handover information.

In some aspects, the UE may identify whether the DRX cycle of the SIM on which the handover information was not received does not overlap (e.g., collide) with a DRX cycle associated with at least one neighbor cell indicated by the handover information. For example, the neighbor cells may be potential cells to replace a serving cell of the SIM on which the handover information is received. Therefore, the UE may determine whether the neighbor cells will collide with the DRX cycle of the SIM on which the handover information was not received because the neighbor cell may be replacing the serving cell of the SIM on which the handover information was received. For example, if the UE receives the handover information from a serving cell of the first SIM, then the UE may determine whether the DRX cycle of the second SIM does not overlap (e.g., collide) with a DRX cycle of at least one neighbor cell indicated by the handover information.

If the UE identifies that there are no neighbor cells that resolve the collision (block 650—No), then the UE may continue with the current configuration (block 640). For example, if the UE identifies that all neighbor cells indicated by the handover information have DRX cycles that at least partially collide with the first DRX cycle and/or the second DRX cycle, then the UE may continue to operate with the current DRX configurations for the first SIM and the second SIM. This conserves resources that would have otherwise been used to initiate a handover to a neighbor cell that has a DRX configuration that also results in a collision.

If the UE identifies at least one neighbor cell that resolves the collision (block 650—Yes), then the UE may select a neighbor cell for a handover procedure (block 660). For example, the UE may evaluate neighbor cells that resolve the collision based at least in part on an energy (e.g., an RSRP or a signal-to-noise ratio (SNR)) of the neighbor cells and/or a quality (e.g., an RSRQ) of the neighbor cells, among other examples. In some aspects, the UE may determine whether a quality of a neighbor cell that resolves the collision satisfies a quality threshold. In some aspects, the quality threshold may be indicated in the handover information and/or may be defined, or otherwise fixed, by a wireless communication standard (e.g., a 3GPP Specification).

In some aspects, where multiple neighbor cells that resolve the collision have a link quality that satisfies the quality threshold, the UE may select a neighbor cell based at least in part on the quality of the neighbor cells and/or the signal energy of the neighbor cells. For example, the UE may identify that a set (e.g., one or more) of neighbor cells are associated with DRX cycles that do not overlap with at least one of the first DRX cycle or the second DRX cycle. The UE may determine whether a link quality of neighbor cells included in the set of neighbor cells satisfies the quality threshold. The UE may select a best neighbor cell (e.g., a neighbor cell with a best quality (e.g., RSRQ) or energy (e.g., RSRP or SNR)) from the set of neighbor cells. For example, the UE may select the neighbor cell that is associated with a highest received quality value of received quality values of the neighbor cells included in the set of neighbor cells.

The quality threshold and the other quality and/or energy considerations described above may be unrelated to the handover information (e.g., to the CHO configuration and/or the CPC configuration). For example, the UE may select a neighbor cell from the neighbor cells indicated by the handover information even if a criterion or trigger indicated by the handover information is not met. As described above, the handover information (e.g., the CHO configuration and/or the CPC configuration) may indicate one or more criteria or triggers for applying a handover command to a neighbor cell, such as an RSRP or an RSRQ threshold. The UE may select a neighbor cell from the neighbor cells indicated by the handover information to resolve the DRX collision, as described above, regardless of whether the one or more criteria or triggers for applying a handover command to a neighbor cell have been met or satisfied. Therefore, the UE may be enabled to leverage the information (e.g., DRX cycle configuration information) indicated by the handover information to resolve DRX cycle collisions experienced by the UE. This conserves resources that would have otherwise been used to transmit a message (such as a measurement report) to trigger a handover to resolve the DRX cycle collision while also ensuring that a neighbor cell is selected that is associated with a DRX cycle that will resolve the DRX cycle collision.

The UE may perform a handover to the selected neighbor cell (block 670). For example, the UE may transmit, to the neighbor cell (e.g., to a base station associated with the neighbor cell), a message associated with handover of at least one of the first SIM or the second SIM to the neighbor cell. For example, the UE may establish a connection with the neighbor cell using the first SIM or the second SIM. The UE may transmit, to the neighbor cell, a RACH message (e.g., associated with a RACH procedure, such as a two-step RACH procedure or a four-step RACH procedure) to initiate a RACH procure with the neighbor cell. The UE may transmit, to the neighbor cell, an indication that the UE has completed the handover indicated by the handover information. For example, as described above, the handover information may include a conditional handover command. The UE may transmit, to the neighbor cell (e.g., without communicating with the serving cell that configured the conditional handover command), that the UE has triggered the handover command configured by the serving cell. This may enable the neighbor cell to communicate with the serving cell to perform any necessary actions to complete the handover of the UE from the serving cell to the neighbor cell.

After completing a handover to the selected neighbor cell, the UE may perform one or more actions to ensure that the UE does not return to the cell (e.g., the previous serving cell) that caused the DRX cycle collision. For example, the UE may apply a power offset value to a measurement of the neighbor cell (e.g., the new serving cell of a SIM of the UE) to ensure that the UE remains connected to the neighbor cell (block 680). In some aspects, the UE may transmit, after performing the handover to the neighbor cell, a measurement report indicating a measurement value of the neighbor cell that is modified based at least in part on a power offset value.

For example, the UE may measure a first measurement value of the previous serving cell associated with the DRX cycle collision. The UE may measure a second measurement value of the neighbor cell (e.g., the new serving cell). The UE may modify the second measurement value to a modified second measurement value such that a difference between the first measurement value and the modified second measurement value is the power offset value. The UE may transmit a measurement report indicating the modified second measurement value. For example, the UE may ensure that a difference between measurement values of the neighbor cell and measurement values of the previous serving cell are always at least the power offset value. In this way, the UE may ensure that a measurement value (e.g., an RSRP value) of the neighbor cell remains at least the power offset value better than a measurement value (e.g., an RSRP value) of the previous serving cell associated with the DRX cycle collision. This may ensure that the network does not initiate a handover procedure for the UE back to the previous serving cell.

In some aspects, the UE may continue to modify the measurement values of the neighbor cell as described above while the UE is operating in the DSDS mode and/or while both the first SIM and the second SIM are in a connected mode. For example, if one of the first SIM or the second SIM transitions out of the connected mode, then the UE may no longer modify the measurement values of the neighbor cell as described above (e.g., as a new DRX cycle may be configured and the DRX cycle collision may be resolved).

As a result, the UE may be enabled to identify a neighbor cell with a DRX cycle that resolves the collision (e.g., that does not collide with the first DRX cycle and/or the second DRX cycle) prior to transmitting a measurement report or another message to initiate a handover procedure. Therefore, the UE is enabled to identify a suitable neighbor cell without transmitting any signals (e.g., a measurement report). This reduces a signaling overhead and a latency associated with identifying a neighbor cell to resolve an identified DRX collision. By ensuring that a neighbor cell resolves an identified DRX collision and by establishing a connection with the neighbor cell for the first SIM or the second SIM, the UE may improve throughput, improve reliability (e.g., of calls), reduce latency, improve a user experience, and/or reduce occurrences of an OOS status or an RLF status, among other examples.

As indicated above, FIGS. 5 and 6 are provided as one or more examples. Other examples may differ from what is described with regard to FIGS. 5 and 6.

Figure 7:
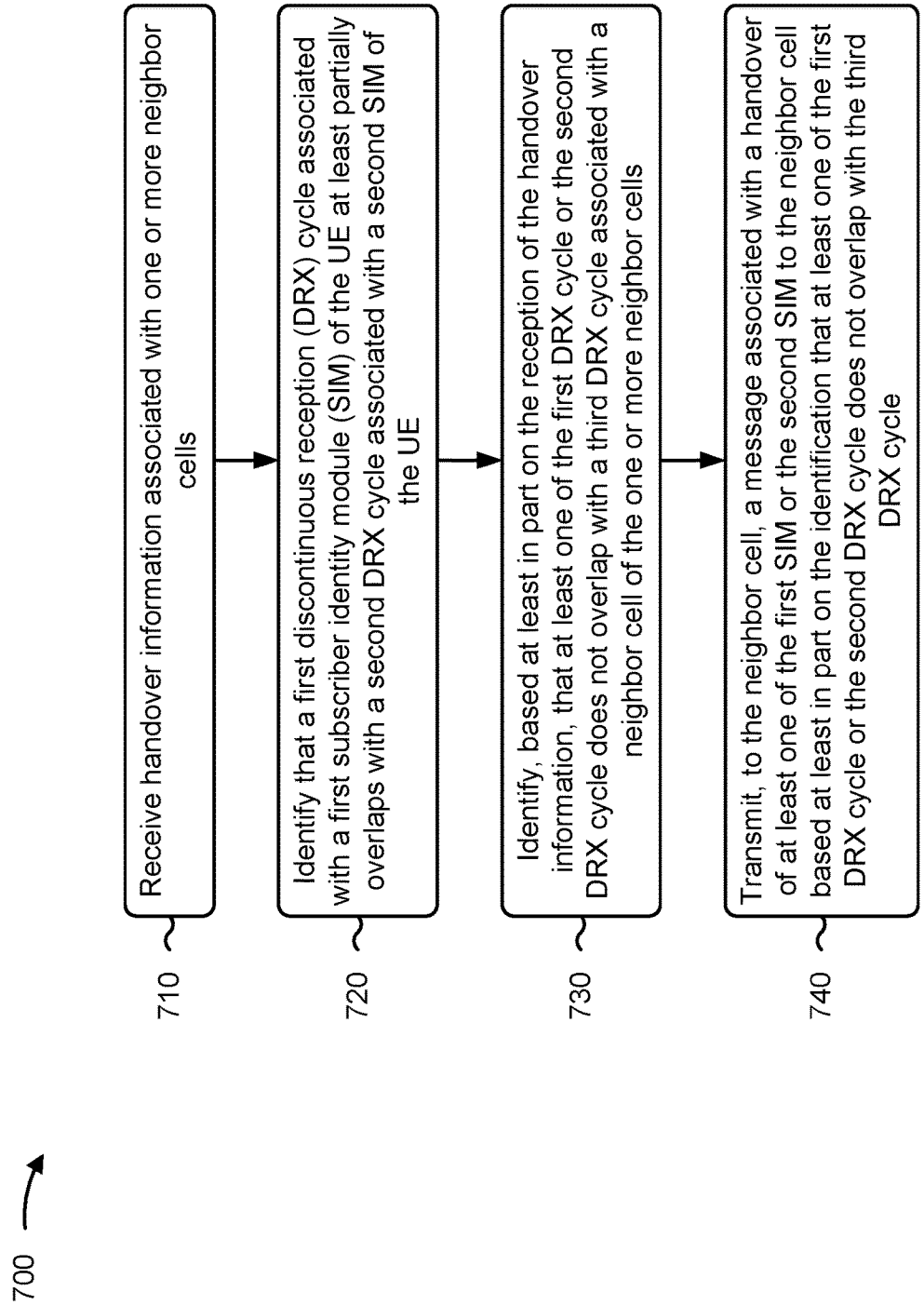
FIG. 7 is a diagram illustrating an example process associated with DRX cycle collision handling for a multi-SIM UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with DRX collision handling multi-SIM UE.

As shown in FIG. 7, in some aspects, process 700 may include receiving handover information associated with one or more neighbor cells (block 710). For example, the UE (e.g., using reception component 802, depicted in FIG. 8) may receive handover information associated with one or more neighbor cells, as described above.

As further shown in FIG. 7, in some aspects, process 700 may include identifying that a first DRX cycle associated with a first SIM of the UE at least partially overlaps with a second DRX cycle associated with a second SIM of the UE (block 720). For example, the UE (e.g., using collision identification component 808, depicted in FIG. 8) may identify that a first DRX cycle associated with a first SIM of the UE at least partially overlaps with a second DRX cycle associated with a second SIM of the UE, as described above.

As further shown in FIG. 7, in some aspects, process 700 may include identifying, based at least in part on the reception of the handover information, that at least one of the first DRX cycle or the second DRX cycle does not overlap with a third DRX cycle associated with a neighbor cell of the one or more neighbor cells (block 730). For example, the UE (e.g., using collision management component 810, depicted in FIG. 8) may identify, based at least in part on the reception of the handover information, that at least one of the first DRX cycle or the second DRX cycle does not overlap with a third DRX cycle associated with a neighbor cell of the one or more neighbor cells, as described above.

As further shown in FIG. 7, in some aspects, process 700 may include transmitting, to the neighbor cell, a message associated with a handover of at least one of the first SIM or the second SIM to the neighbor cell based at least in part on the identification that at least one of the first DRX cycle or the second DRX cycle does not overlap with the third DRX cycle (block 740). For example, the UE (e.g., using transmission component 804, depicted in FIG. 8) may transmit, to the neighbor cell, a message associated with a handover of at least one of the first SIM or the second SIM to the neighbor cell based at least in part on the identification that at least one of the first DRX cycle or the second DRX cycle does not overlap with the third DRX cycle, as described above.

Process 700 may include additional aspects, such as any single aspect or any combination of aspects described below and/or in connection with one or more other processes described elsewhere herein.

In a first aspect, receiving the handover information comprises receiving (e.g., using reception component 802, depicted in FIG. 8) a radio resource control configuration message associated with a conditional handover or a conditional primary secondary cell change indicating the handover information for the one or more neighbor cells.

In a second aspect, alone or in combination with the first aspect, transmitting the message associated with the handover is based at least in part on a quality of the neighbor cell satisfying a quality threshold.

In a third aspect, alone or in combination with one or more of the first and second aspects, identifying that at least one of the first DRX cycle or the second DRX cycle does not overlap with the third DRX cycle comprises identifying (e.g., using collision management component 810, depicted in FIG. 8) that a set of neighbor cells, that includes the neighbor cell, are associated with DRX cycles that do not overlap with at least one of the first DRX cycle or the second DRX cycle, determining (e.g., using collision management component 810, depicted in FIG. 8) whether a quality of neighbor cells included in the set of neighbor cells satisfies a quality threshold, and selecting (e.g., using collision management component 810, depicted in FIG. 8) the neighbor cell from the set of neighbor cells based at least in part on at least one of a quality of the neighbor cell or the determination of whether the quality of the neighbor cells included in the set of neighbor cells satisfies the quality threshold.

In a fourth aspect, alone or in combination with one or more of the first through third aspects, selecting the neighbor cell from set of neighbor cells comprises determining (e.g., using collision management component 810, depicted in FIG. 8) that the neighbor cell is associated with a highest received quality value of received quality values of the neighbor cells included in the set of neighbor cells.

In a fifth aspect, alone or in combination with one or more of the first through fourth aspects, process 700 includes modifying (e.g., using collision management component 810, depicted in FIG. 8), after performing the handover to the neighbor cell, a measurement value of the neighbor cell based at least in part on a power offset value.

In a sixth aspect, alone or in combination with one or more of the first through fifth aspects, modifying the measurement value of the neighbor cell comprises measuring (e.g., using measurement component 812, depicted in FIG. 8) a first measurement value of a previous serving cell associated with a DRX collision, measuring (e.g., using measurement component 812, depicted in FIG. 8) a second measurement value of the neighbor cell, and modifying (e.g., using collision management component 810, depicted in FIG. 8) the second measurement value to a modified second measurement value such that a difference between the first measurement value and the modified second measurement value is the power offset value.

In a seventh aspect, alone or in combination with one or more of the first through sixth aspects, process 700 includes transmitting (e.g., using transmission component 804, depicted in FIG. 8) a measurement report indicating a modified measurement value of the neighbor cell.

Figure 8:
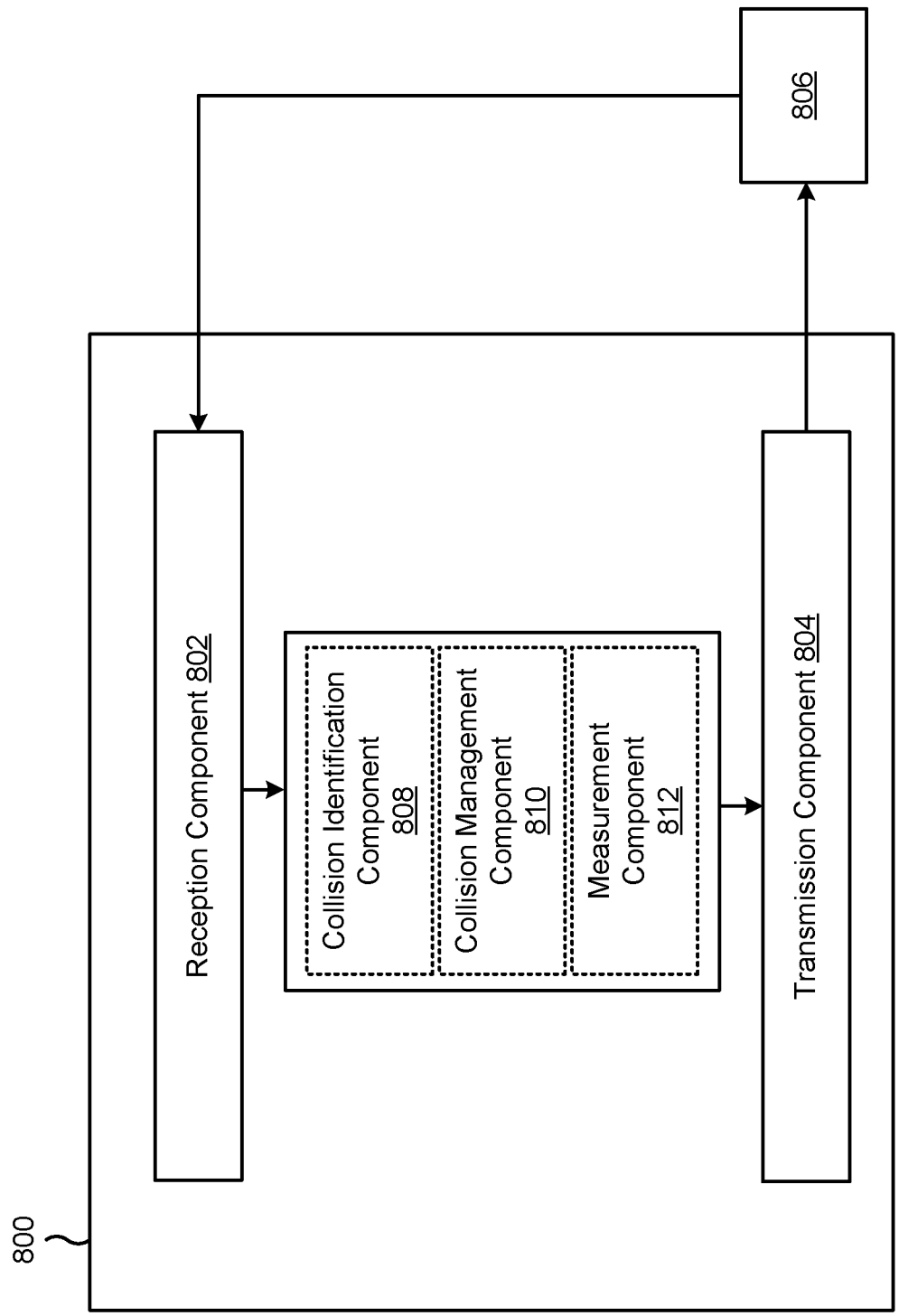
FIGS. 8 and 9 are block diagrams of example apparatuses for wireless communication, in accordance with the present disclosure.

In an eighth aspect, alone or in combination with one or more of the first through seventh aspects, identifying that the first DRX cycle associated with the first SIM of the UE at least partially overlaps with the second DRX cycle associated with the second SIM of the UE comprises identifying (e.g., using collision identification component 808, depicted in FIG. 8) a number of occasions during which the first DRX cycle associated with the first SIM of the UE at least partially overlaps with the second DRX cycle associated with the second SIM, and determining (e.g., using collision identification component 808, depicted in FIG. 8) that a DRX collision event has occurred based at least in part on the number of occasions satisfying a collision threshold.

In a ninth aspect, alone or in combination with one or more of the first through eighth aspects, transmitting the message associated with the handover is based at least in part on the determination that the DRX collision event has occurred.

In a tenth aspect, alone or in combination with one or more of the first through ninth aspects, transmitting the message associated with the handover comprises transmitting (e.g., using transmission component 804, depicted in FIG. 8), to the neighbor cell, a random access channel message to establish a connection with the neighbor cell.

In an eleventh aspect, alone or in combination with one or more of the first through tenth aspects, process 700 includes communicating (e.g., using reception component 802 and/or transmission component 804, depicted in FIG. 8), using at least one of the first SIM or the second SIM, in a DSDS mode.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a collision identification component 808, a collision management component 810, or a measurement component 812, among other examples.

In some aspects, the apparatus 800 may be configured to perform one or more operations described herein in connection with FIGS. 5 and 6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive handover information associated with one or more neighbor cells. The collision identification component 808 may identify that a first DRX cycle associated with a first SIM of the UE at least partially overlaps with a second DRX cycle associated with a second SIM of the UE. The collision management component 810 may identify, based at least in part on the reception of the handover information, that at least one of the first DRX cycle or the second DRX cycle does not overlap with a third DRX cycle associated with a neighbor cell of the one or more neighbor cells. The transmission component 804 may transmit, to the neighbor cell, a message associated with a handover of at least one of the first SIM or the second SIM to the neighbor cell based at least in part on the identification that at least one of the first DRX cycle or the second DRX cycle does not overlap with the third DRX cycle.

The collision management component 810 may modify, after performing the handover to the neighbor cell, a measurement value of the neighbor cell based at least in part on a power offset value. The transmission component 804 may transmit a measurement report indicating a modified measurement value of the neighbor cell.

The reception component 802 and/or the transmission component 804 may communicate, using at least one of the first SIM or the second SIM, in a DSDS mode.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
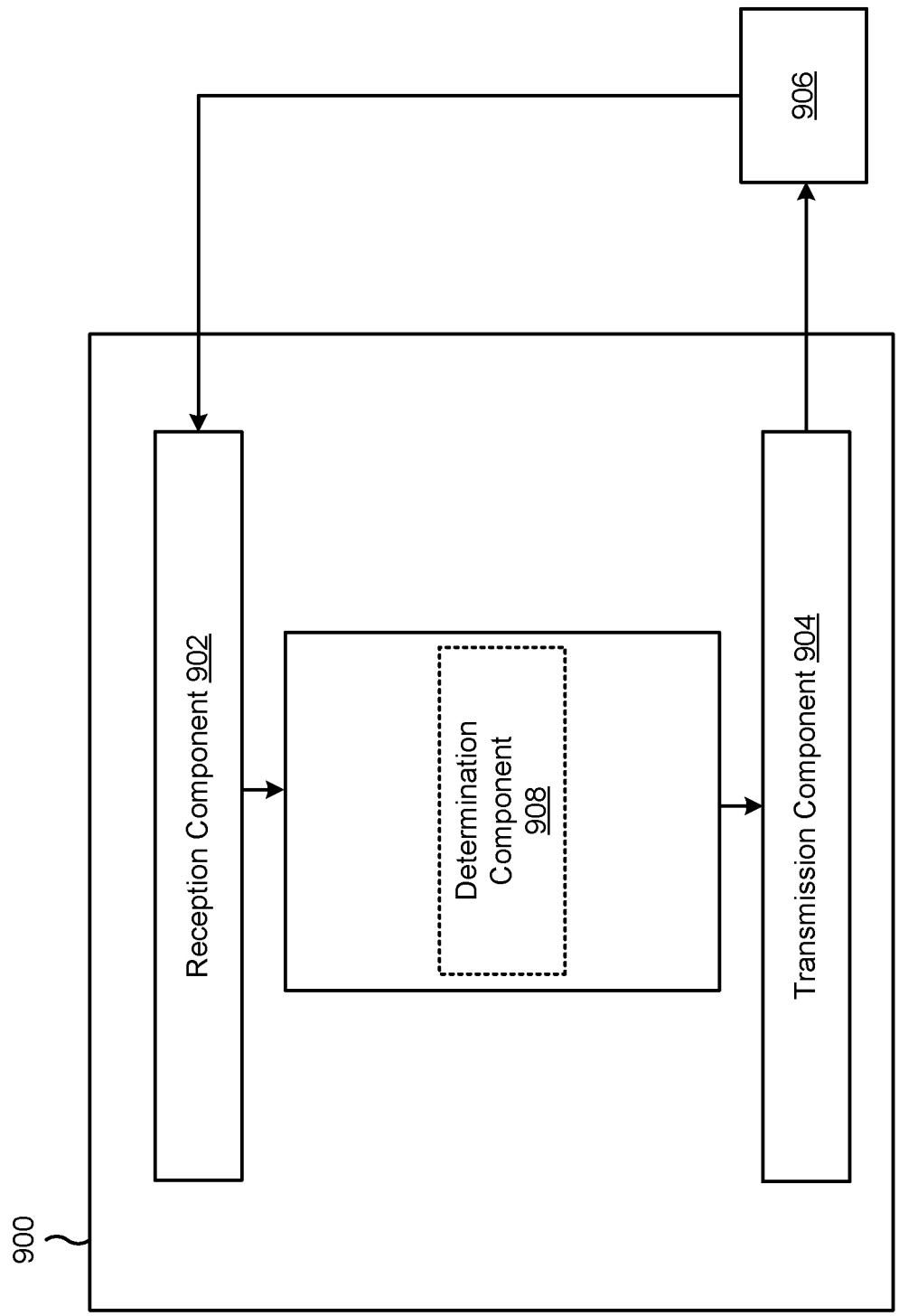

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 5 and 6. Additionally, or alternatively, the apparatus 900 may be configured to perform one or more processes described herein, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit, to a UE, handover information associated with one or more neighbor cells. The transmission component 904 may transmit, to a UE, a CHO configuration or a CPC configuration. The determination component 908 may determine a DRX configuration for at least one SIM of a UE. The reception component 902 may receive, from a UE, a message associated with a handover of at least one SIM of the UE to the apparatus 900 based at least in part on a DRX collision at the UE.

The reception component 902 may receive, from a UE, a measurement report indicating a modified measurement value of the neighbor cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving handover information associated with one or more neighbor cells; identifying that a first discontinuous reception (DRX) cycle associated with a first subscriber identity module (SIM) of the UE at least partially overlaps with a second DRX cycle associated with a second SIM of the UE; identifying, based at least in part on the reception of the handover information, that at least one of the first DRX cycle or the second DRX cycle does not overlap with a third DRX cycle associated with a neighbor cell of the one or more neighbor cells; and transmitting, to the neighbor cell, a message associated with a handover of at least one of the first SIM or the second SIM to the neighbor cell based at least in part on the identification that at least one of the first DRX cycle or the second DRX cycle does not overlap with the third DRX cycle.

Aspect 2: The method of Aspect 1, wherein receiving the handover information comprises: receiving a radio resource control configuration message associated with a conditional handover or a conditional primary secondary cell change indicating the handover information for the one or more neighbor cells.

Aspect 3: The method of any of Aspects 1-2, wherein transmitting the message associated with the handover is based at least in part on a quality of the neighbor cell satisfying a quality threshold.

Aspect 4: The method of any of Aspects 1-3, wherein identifying that at least one of the first DRX cycle or the second DRX cycle does not overlap with the third DRX cycle comprises: identifying that a set of neighbor cells, that includes the neighbor cell, are associated with DRX cycles that do not overlap with at least one of the first DRX cycle or the second DRX cycle; determining whether a quality of neighbor cells included in the set of neighbor cells satisfies a quality threshold; and selecting the neighbor cell from the set of neighbor cells based at least in part on at least one of a quality of the neighbor cell or the determination of whether the quality of the neighbor cells included in the set of neighbor cells satisfies the quality threshold.

Aspect 5: The method of Aspect 4, wherein selecting the neighbor cell from set of neighbor cells comprises: determining that the neighbor cell is associated with a highest received quality value of received quality values of the neighbor cells included in the set of neighbor cells.

Aspect 6: The method of any of Aspects 1-5, further comprising: modifying, after performing the handover to the neighbor cell, a measurement value of the neighbor cell based at least in part on a power offset value.

Aspect 7: The method of Aspect 6, wherein modifying the measurement value of the neighbor cell comprises: measuring a first measurement value of a previous serving cell associated with a DRX collision; measuring a second measurement value of the neighbor cell; and modifying the second measurement value to a modified second measurement value such that a difference between the first measurement value and the modified second measurement value is the power offset value.

Aspect 8: The method of any of Aspects 6-7, further comprising: transmitting a measurement report indicating a modified measurement value of the neighbor cell.

Aspect 9: The method of any of Aspects 1-8, wherein identifying that the first DRX cycle associated with the first SIM of the UE at least partially overlaps with the second DRX cycle associated with the second SIM of the UE comprises: identifying a number of occasions during which the first DRX cycle associated with the first SIM of the UE at least partially overlaps with the second DRX cycle associated with the second SIM; and determining that a DRX collision event has occurred based at least in part on the number of occasions satisfying a collision threshold.

Aspect 10: The method of Aspect 9, wherein transmitting the message associated with the handover is based at least in part on the determination that the DRX collision event has occurred.

Aspect 11: The method of any of Aspects 1-10, wherein transmitting the message associated with the handover comprises: transmitting, to the neighbor cell, a random access channel message to establish a connection with the neighbor cell.

Aspect 12: The method of any of Aspects 1-11, further comprising: communicating, using at least one of the first SIM or the second SIM, in a dual SIM dual standby (DSDS) mode.

Aspect 13: An apparatus for wireless communication at a device, comprising a processor; memory coupled with the processor; and instructions stored in the memory and executable by the processor to cause the apparatus to perform the method of one or more Aspects of Aspects 1-12.

Aspect 14: A device for wireless communication, comprising a memory and one or more processors coupled to the memory, the memory and the one or more processors configured to perform the method of one or more Aspects of Aspects 1-12.

Aspect 15: An apparatus for wireless communication, comprising at least one means for performing the method of one or more Aspects of Aspects 1-12.

Aspect 16: A non-transitory computer-readable medium storing code for wireless communication, the code comprising instructions executable by a processor to perform the method of one or more Aspects of Aspects 1-12.

Aspect 17: A non-transitory computer-readable medium storing a set of instructions for wireless communication, the set of instructions comprising one or more instructions that, when executed by one or more processors of a device, cause the device to perform the method of one or more Aspects of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving handover information associated with one or more neighbor cells;
   identifying that a first discontinuous reception (DRX) cycle associated with a first subscriber identity module (SIM) of the UE at least partially overlaps with a second DRX cycle associated with a second SIM of the UE;
   identifying, based at least in part on the reception of the handover information, that at least one of the first DRX cycle or the second DRX cycle does not overlap with a third DRX cycle associated with a neighbor cell of the one or more neighbor cells;
   transmitting, to the neighbor cell, a message associated with a handover of at least one of the first SIM or the second SIM to the neighbor cell based at least in part on the identification that the first DRX cycle at least partially overlaps with the second DRX cycle and the identification that at least one of the first DRX cycle or the second DRX cycle does not overlap with the third DRX cycle; and
   establishing a connection with the neighbor cell for the first SIM or the second SIM based at least in part on the transmission of the message associated with the handover.

2. The method of claim 1, wherein receiving the handover information comprises:
   receiving a radio resource control configuration message associated with a conditional handover or a conditional primary secondary cell change indicating the handover information for the one or more neighbor cells.

3. The method of claim 1, wherein transmitting the message associated with the handover is based at least in part on a quality of the neighbor cell satisfying a quality threshold.

4. The method of claim 1, wherein identifying that at least one of the first DRX cycle or the second DRX cycle does not overlap with the third DRX cycle comprises:
  identifying that a set of neighbor cells, that includes the neighbor cell, are associated with DRX cycles that do not overlap with at least one of the first DRX cycle or the second DRX cycle;
  determining whether a quality of neighbor cells included in the set of neighbor cells satisfies a quality threshold; and
  selecting the neighbor cell from the set of neighbor cells based at least in part on at least one of a quality of the neighbor cell or the determination of whether the quality of the neighbor cells included in the set of neighbor cells satisfies the quality threshold.

5. The method of claim 4, wherein selecting the neighbor cell from set of neighbor cells comprises:
  determining that the neighbor cell is associated with a highest received quality value of received quality values of the neighbor cells included in the set of neighbor cells.

6. The method of claim 1, further comprising:
  modifying, after performing the handover to the neighbor cell, a measurement value of the neighbor cell based at least in part on a power offset value.

7. The method of claim 6, wherein modifying the measurement value of the neighbor cell comprises:
  measuring a first measurement value of a previous serving cell associated with a DRX collision;
  measuring a second measurement value of the neighbor cell; and
  modifying the second measurement value to a modified second measurement value such that a difference between the first measurement value and the modified second measurement value is the power offset value.

8. The method of claim 6, further comprising:
  transmitting a measurement report indicating a modified measurement value of the neighbor cell.

9. The method of claim 1, wherein identifying that the first DRX cycle associated with the first SIM of the UE at least partially overlaps with the second DRX cycle associated with the second SIM of the UE comprises:
  identifying a number of occasions during which the first DRX cycle associated with the first SIM of the UE at least partially overlaps with the second DRX cycle associated with the second SIM; and
  determining that a DRX collision event has occurred based at least in part on the number of occasions satisfying a collision threshold.

10. The method of claim 9, wherein transmitting the message associated with the handover is based at least in part on the determination that the DRX collision event has occurred.

11. The method of claim 1, wherein transmitting the message associated with the handover comprises:
  transmitting, to the neighbor cell, a random access channel message to establish the connection with the neighbor cell.

12. The method of claim 1, further comprising:
  communicating, using at least one of the first SIM or the second SIM, in a dual SIM dual standby (DSDS) mode.

13. A user equipment (UE) for wireless communication, comprising:
  a memory; and
  one or more processors, coupled to the memory, configured to:
    receive handover information associated with one or more neighbor cells;
    identify that a first discontinuous reception (DRX) cycle associated with a first subscriber identity module (SIM) of the UE at least partially overlaps with a second DRX cycle associated with a second SIM of the UE;
    identify, based at least in part on the reception of the handover information, that at least one of the first DRX cycle or the second DRX cycle does not overlap with a third DRX cycle associated with a neighbor cell of the one or more neighbor cells;
    transmit, to the neighbor cell, a message associated with a handover of at least one of the first SIM or the second SIM to the neighbor cell based at least in part on the identification that the first DRX cycle at least partially overlaps with the second DRX cycle and the identification that at least one of the first DRX cycle or the second DRX cycle does not overlap with the third DRX cycle; and
    establish a connection with the neighbor cell for the first SIM or the second SIM based at least in part on the transmission of the message associated with the handover.

14. The UE of claim 13, wherein the one or more processors, to receive the handover information, are configured to:
  receive a radio resource control configuration message associated with a conditional handover or a conditional primary secondary cell change indicating the handover information for the one or more neighbor cells.

15. The UE of claim 13, wherein transmitting the message associated with the handover is based at least in part on a quality of the neighbor cell satisfying a quality threshold.

16. The UE of claim 13, wherein the one or more processors, to identify that at least one of the first DRX cycle or the second DRX cycle does not overlap with the third DRX cycle, are configured to:
  identify that a set of neighbor cells, that includes the neighbor cell, are associated with DRX cycles that do not overlap with at least one of the first DRX cycle or the second DRX cycle;
  determine whether a quality of neighbor cells included in the set of neighbor cells satisfies a quality threshold; and
  select the neighbor cell from the set of neighbor cells based at least in part on at least one of a quality of the neighbor cell or the determination of whether the quality of the neighbor cells included in the set of neighbor cells satisfies the quality threshold.

17. The UE of claim 16, wherein the one or more processors, to select the neighbor cell from set of neighbor cells, are configured to:
  determine that the neighbor cell is associated with a highest received quality value of received quality values of the neighbor cells included in the set of neighbor cells.

18. The UE of claim 13, wherein the one or more processors are further configured to:
  modify, after performing the handover to the neighbor cell, a measurement value of the neighbor cell based at least in part on a power offset value.

19. The UE of claim 18, wherein the one or more processors, to modify the measurement value of the neighbor cell, are configured to:
  measure a first measurement value of a previous serving cell associated with a DRX collision;

measure a second measurement value of the neighbor cell; and modify the second measurement value to a modified second measurement value such that a difference between the first measurement value and the modified second measurement value is the power offset value.

20. The UE of claim 18, wherein the one or more processors are further configured to:

transmit a measurement report indicating a modified measurement value of the neighbor cell.

21. The UE of claim 13, wherein the one or more processors, to identify that the first DRX cycle associated with the first SIM of the UE at least partially overlaps with the second DRX cycle associated with the second SIM of the UE, are configured to:

identify a number of occasions during which the first DRX cycle associated with the first SIM of the UE at least partially overlaps with the second DRX cycle associated with the second SIM; and determine that a DRX collision event has occurred based at least in part on the number of occasions satisfying a collision threshold.

22. The UE of claim 21, wherein transmitting the message associated with the handover is based at least in part on the determination that the DRX collision event has occurred.

23. The UE of claim 13, wherein the one or more processors, to transmit the message associated with the handover, are configured to:

transmit, to the neighbor cell, a random access channel message to establish the connection with the neighbor cell.

24. The UE of claim 13, wherein the one or more processors are further configured to:

communicate, using at least one of the first SIM or the second SIM, in a dual SIM dual standby (DSDS) mode.

25. A non-transitory computer-readable medium storing a set of instructions for wireless communication, the set of instructions comprising:

one or more instructions that, when executed by one or more processors of a user equipment (UE), cause the UE to:

receive handover information associated with one or more neighbor cells;

identify that a first discontinuous reception (DRX) cycle associated with a first subscriber identity module (SIM) of the UE at least partially overlaps with a second DRX cycle associated with a second SIM of the UE;

identify, based at least in part on the reception of the handover information, that at least one of the first DRX cycle or the second DRX cycle does not overlap with a third DRX cycle associated with a neighbor cell of the one or more neighbor cells;

transmit, to the neighbor cell, a message associated with a handover of at least one of the first SIM or the second SIM to the neighbor cell based at least in part on the identification that the first DRX cycle at least partially overlaps with the second DRX cycle and the identification that at least one of the first DRX cycle or the second DRX cycle does not overlap with the third DRX cycle; and establish a connection with the neighbor cell for the first SIM or the second SIM based at least in part on the transmission of the message associated with the handover.

26. The non-transitory computer-readable medium of claim 25, wherein the one or more instructions, that cause the UE to identify that at least one of the first DRX cycle or the second DRX cycle does not overlap with the third DRX cycle, cause the UE to:

identify that a set of neighbor cells, that includes the neighbor cell, are associated with DRX cycles that do not overlap with at least one of the first DRX cycle or the second DRX cycle;

determine whether a quality of neighbor cells included in the set of neighbor cells satisfies a quality threshold; and select the neighbor cell from the set of neighbor cells based at least in part on at least one of a quality of the neighbor cell or the determination of whether the quality of the neighbor cells included in the set of neighbor cells satisfies the quality threshold.

27. The non-transitory computer-readable medium of claim 25, wherein the one or more instructions further cause the UE to:

modify, after performing the handover to the neighbor cell, a measurement value of the neighbor cell based at least in part on a power offset value.

28. An apparatus for wireless communication, comprising:

means for receiving handover information associated with one or m ore neighbor cells;

means for identifying that a first discontinuous reception (DRX) cycle associated with a first subscriber identity module (SIM) of the apparatus at least partially overlaps with a second DRX cycle associated with a second SIM of the apparatus;

means for identifying, based at least in part on the reception of the handover information, that at least one of the first DRX cycle or the second DRX cycle does not overlap with a third DRX cycle associated with a neighbor cell of the one or more neighbor cells;

means for transmitting, to the neighbor cell, a message associated with a handover of at least one of the first SIM or the second SIM to the neighbor cell based at least in part on the identification that the first DRX cycle at least partially overlaps with the second DRX cycle and the identification that at least one of the first DRX cycle or the second DRX cycle does not overlap with the third DRX cycle; and means for establishing a connection with the neighbor cell for the first SIM or the second SIM based at least in part on the transmission of the message associated with the handover.

29. The apparatus of claim 28, wherein the means for identifying that at least one of the first DRX cycle or the second DRX cycle does not overlap with the third DRX cycle comprises:

means for identifying that a set of neighbor cells, that includes the neighbor cell, are associated with DRX cycles that do not overlap with at least one of the first DRX cycle or the second DRX cycle;

means for determining whether a quality of neighbor cells included in the set of neighbor cells satisfies a quality threshold; and means for selecting the neighbor cell from the set of neighbor cells based at least in part on at least one of a quality of the neighbor cell or the determination of whether the quality of the neighbor cells included in the set of neighbor cells satisfies the quality threshold.

30. The apparatus of claim 28, further comprising:

means for modifying, after performing the handover to the neighbor cell, a measurement value of the neighbor cell based at least in part on a power offset value.

* * * * *